(12) United States Patent
Zarev

(10) Patent No.: US 12,321,309 B1
(45) Date of Patent: Jun. 3, 2025

(54) HIGH-PERFORMANCE RADIATION TOLERANT DUAL PROCESSOR SINGLE BOARD COMPUTER

(71) Applicant: FRONTGRADE TECHNOLOGIES INC., Arlington, VA (US)

(72) Inventor: Sasko Zarev, Colorado Springs, CO (US)

(73) Assignee: FRONTGRADE TECHNOLOGIES INC., Arlington, VA (US)

( * ) Notice: Subject to any disclaimer, the term of this patent is extended or adjusted under 35 U.S.C. 154(b) by 168 days.

(21) Appl. No.: 18/083,331

(22) Filed: Dec. 16, 2022

(51) Int. Cl.
*G06F 15/17* (2006.01)
*G06F 9/445* (2018.01)

(52) U.S. Cl.
CPC .......... *G06F 15/17* (2013.01); *G06F 9/44505* (2013.01)

(58) Field of Classification Search
CPC . G06F 15/17; G06F 9/44505; H03K 19/0033; H03K 2017/0803
USPC .......................................................... 714/10
See application file for complete search history.

(56) References Cited

U.S. PATENT DOCUMENTS

| | | | |
|---|---|---|---|
| 2011/0107158 A1* | 5/2011 | Espinosa | G06F 11/106 714/54 |
| 2019/0179909 A1* | 6/2019 | Baumann | G06F 1/30 |

\* cited by examiner

*Primary Examiner* — Yair Leibovich
(74) *Attorney, Agent, or Firm* — ALSTON & BIRD LLP

(57) ABSTRACT

Apparatuses, systems, and methods for dual processor single board computers are provided. For example, a dual processor single board computer may include a management processor with associated memory, an application co-processor with associated memory, and a plurality of bus switches. The dual processor single board computer may be used in devices that may be exposed to radiation, such as satellites. During a radiation event, the management processor may continue operation and isolate the application co-processor and certain memories to cease operation to increase the amount of radiation safely received before damage. After the radiation event, the management processor may reboot the application co-processor, and update applications to allow a device to continue its mission.

20 Claims, 7 Drawing Sheets

HIGH-PERFORMANCE RADIATION TOLERANT DUAL PROCESSOR SINGLE BOARD COMPUTER

TECHNOLOGICAL FIELD

Embodiments of the present invention relate generally to a dual processor single board computer, and more particularly to a dual processor single board computer configured for high performance and radiation tolerance.

BACKGROUND

Single board computers are full functioning computers built on a single board, such as a printed circuit board. Single board computers may be used in applications exposing the single board computer to radiation, such as a satellite traveling through space receiving radiation from a solar flare. The radiation received may cause damage or destruction of the single board computer or a system or device utilizing the single board computer, such as the satellite or the like. Conventional single board computers experience failures when exposed to events with high levels of radiation, which may jeopardize a mission.

New apparatuses, systems, and methods in dual processor single board computers are needed. The inventor has identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to apparatuses, systems, and methods for dual processor single board computers.

In accordance with some embodiments of the present disclosure, an example dual processor single board computer is provided. The dual processor single board computer may comprise a management processor, wherein the management processor is radiation hardened. The dual processor single board computer may further comprise an application co-processor electrically connected to a first bus switch and a second bus switch, and wherein the application co-processor is configured to: run an application; save a first configuration file associated with the application. The dual processor single board computer may further comprise a first memory electrically connected to the application co-processor and electrically connected to the first bus switch and the second bus switch, wherein the first memory is configured to store an application. The dual processor single board computer may further comprise a power source connected to the first bus switch and a ground connected to the second bus switch. The dual processor single board computer may further comprise the first bus switch configured with at least an open position and a closed position, wherein in the closed position the first bus switch is configured to electrically connect the application co-processor and the first memory to the power source, and wherein in the open position the first bus switch is configured to isolate the application co-processor and the first memory from the power source. The dual processor single board computer may further comprise the second bus switch configured with at least an open position and a closed position, wherein in the closed position the second bus switch is configured to electrically connect the application co-processor and the first memory to ground, and wherein in the open position the second bus switch is configured to isolate the application co-processor and the first memory from the ground. The dual processor single board computer may further comprise the management processor configured to: determine a detection of a radiation event; transmit, on determination of the radiation event, to the first bus switch and the second bus switch a first signal to cause the first bus switch and the second bus switch to open; determine that the radiation event has passed; transmit, on a determination that the radiation event has passed, to the first bus switch and the second bus switch a second signal to cause the first bus switch and the second bus switch to close; transmit to the application co-processor a signal to cause the application co-processor to reboot the application; and wherein the application co-processor is further configured to update, after the application is rebooted, the application based on the first configuration file.

In some embodiments, the dual processor single board computer further comprises at least one of a backplane and a front panel, and wherein the management processor is configured to receive a first sensor signal from a sensor via a backplane interface or a front panel interface.

In some embodiments, the detection of a radiation event is based on the first sensor signal.

In some embodiments, the management processor is further configured to receive a second sensor signal from the sensor, and wherein the determination that the radiation event has passed is based on a second sensor signal.

In some embodiments, the second sensor signal is associated with a radiation level falling below a radiation event threshold.

In some embodiments, the first sensor signal comprises a radiation level measurement, and wherein to determine a detection of a radiation event comprises comparing the radiation level measurement to a radiation event threshold.

In some embodiments, the management processor is radiation hardened to at least 20,000 kilo-rads.

In some embodiments, the application co-processor comprises an encrypted memory cache and wherein the management processor comprises an unencrypted memory cache.

In some embodiments, the first memory is comprised of NOR flash memory.

In some embodiments, the dual processor single board computer further comprises a printed circuit board with a front plane and a back plane, and wherein the management processor, the application co-processor, the first memory, the first bus switch, and the second bus switch are mounted on the printed circuit board.

In accordance with some embodiments of the present disclosure, an example method is provided. The method may comprise: providing a dual processor single board computer comprising: a management processor, wherein the management processor is radiation hardened; an application co-processor electrically connected to a first bus switch and a second bus switch; a first memory electrically connected to the application co-processor and electrically connected to the first bust switch and the second bus switch; wherein the first bus switch and the second bus switch are configured to operate to open and close. The method may further comprise: executing an application on the application co-processor; determining, by the management processor, a detection of a radiation event; generating, by the management processor, a control signal to operate the first bus switch and the second bus switch to open; opening, in response to the radiation event, the first bus switch and the second bus switch based on the control signal generated by the management processor, wherein opening the first bus switch isolates the application co-processor and the first memory from a power source and opening the second bus switch isolates the application co-processor and the first memory from a ground; determining that the radiation event has passed; closing, on a determination that the radiation event has passed, the first bus switch and the second bus switch, wherein closing the first bus switch electrically connects the application co-processor and the first memory to the power source and closing the second bus switch electrically connects the application co-processor and the first memory to the ground; rebooting the application on the application co-processor.

In some embodiments, the dual processor single board computer further comprises a backplane and a front panel; and the method further comprises receiving, prior to determining the occurrence of a radiation event, a first sensor signal at the management processor from a sensor via a backplane interface or a front panel interface.

In some embodiments, the determining of a radiation event is based on the first sensor signal.

In some embodiments, the method further comprises: receiving at the management processor a second sensor signal from the sensor; and determining, based on a second sensor signal, that the occurrence of the radiation event has passed.

In some embodiments, the second sensor signal is associated with a radiation level falling below a radiation event threshold.

In some embodiments, the first sensor signal comprises a radiation level measurement, and wherein determining of a radiation event is based on the first sensor signal comprises comparing the radiation level measurement to a radiation event threshold.

In some embodiments, the method may further comprise: verifying, after rebooting the application, the application rebooted correctly.

In some embodiments, the method may further comprise: saving, by the application co-processor and before determining the detection of a radiation event, a configuration file associated with the application executed on the application co-processor; and updating, after the application is rebooted, the application based on the configuration file.

In some embodiments, the method may further comprise: saving, after saving the configuration file, one or more additional configuration files associated with the application executed on the application co-processor, wherein each of the configuration file and the additional configuration files is saved with a timestamp; and wherein updating the application based on the configuration file or the additional configuration file with the most recent timestamp.

In some embodiments, the method may further comprise: iteratively updating, after saving the configuration file but before determining the detection of the radiation event, the save of the configuration file.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1A:
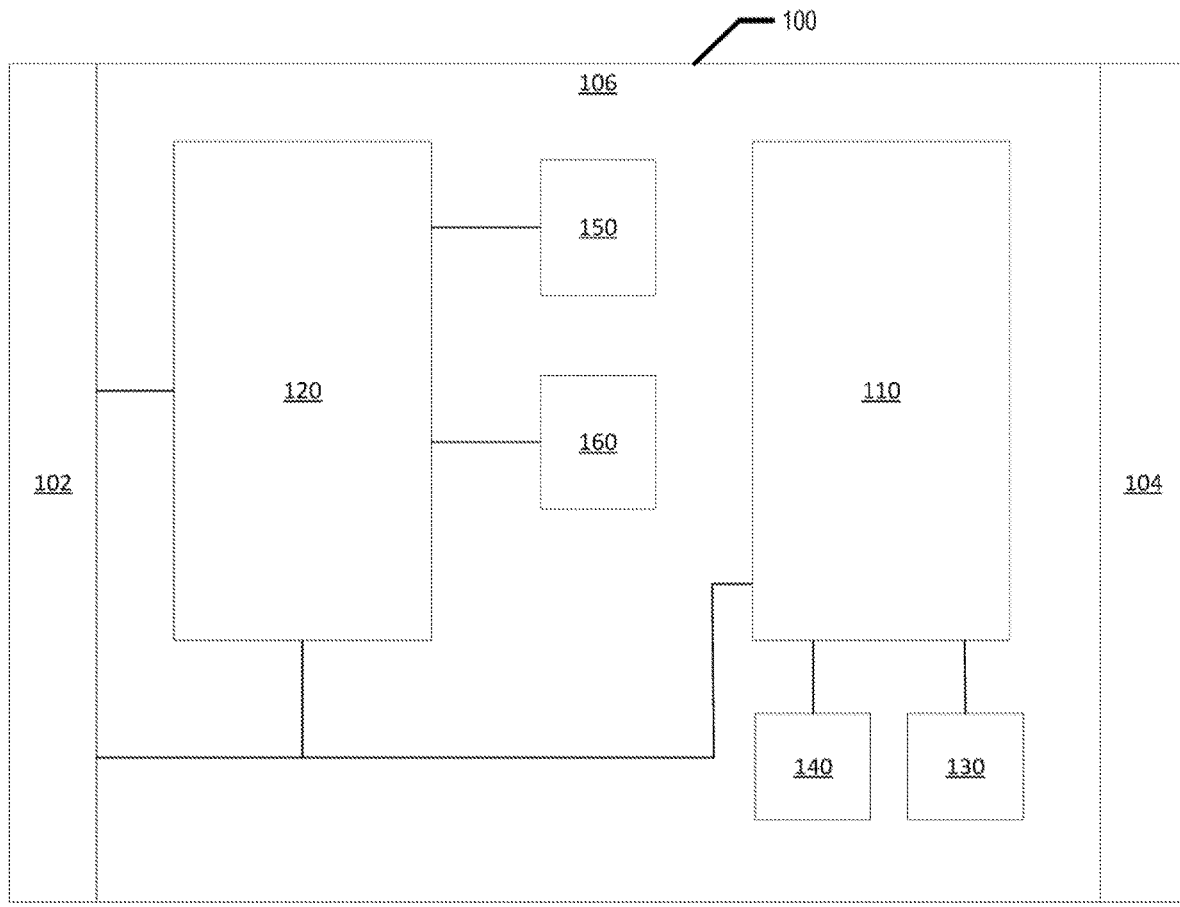
Figure 1B:
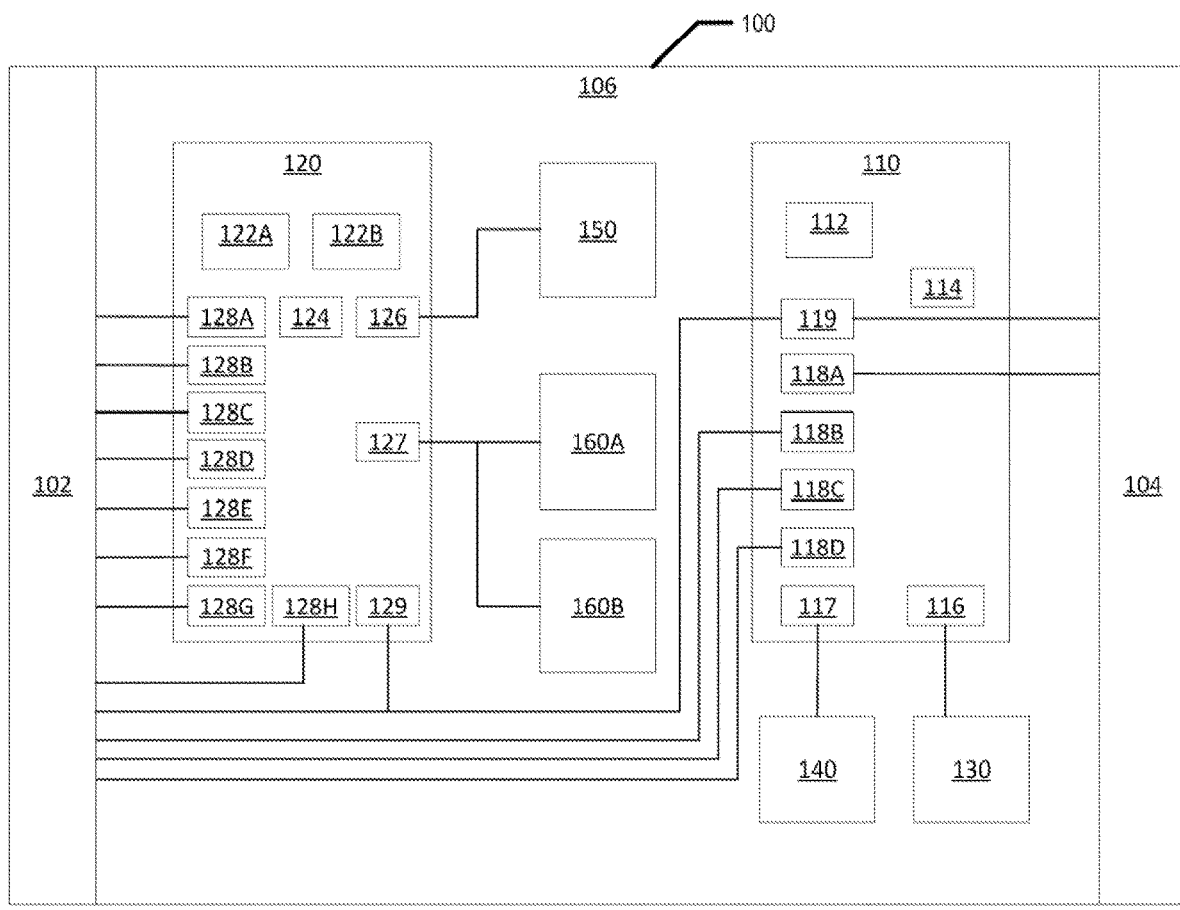
Figure 2:
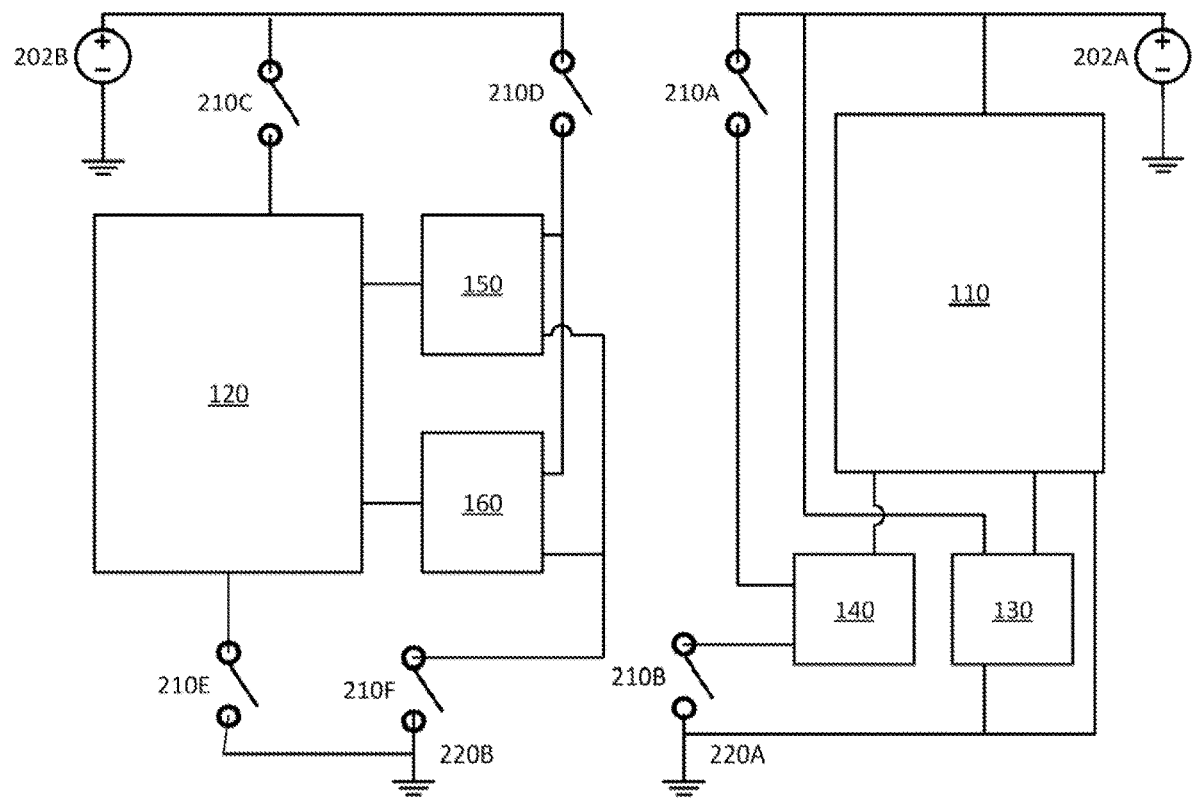
Figure 3:
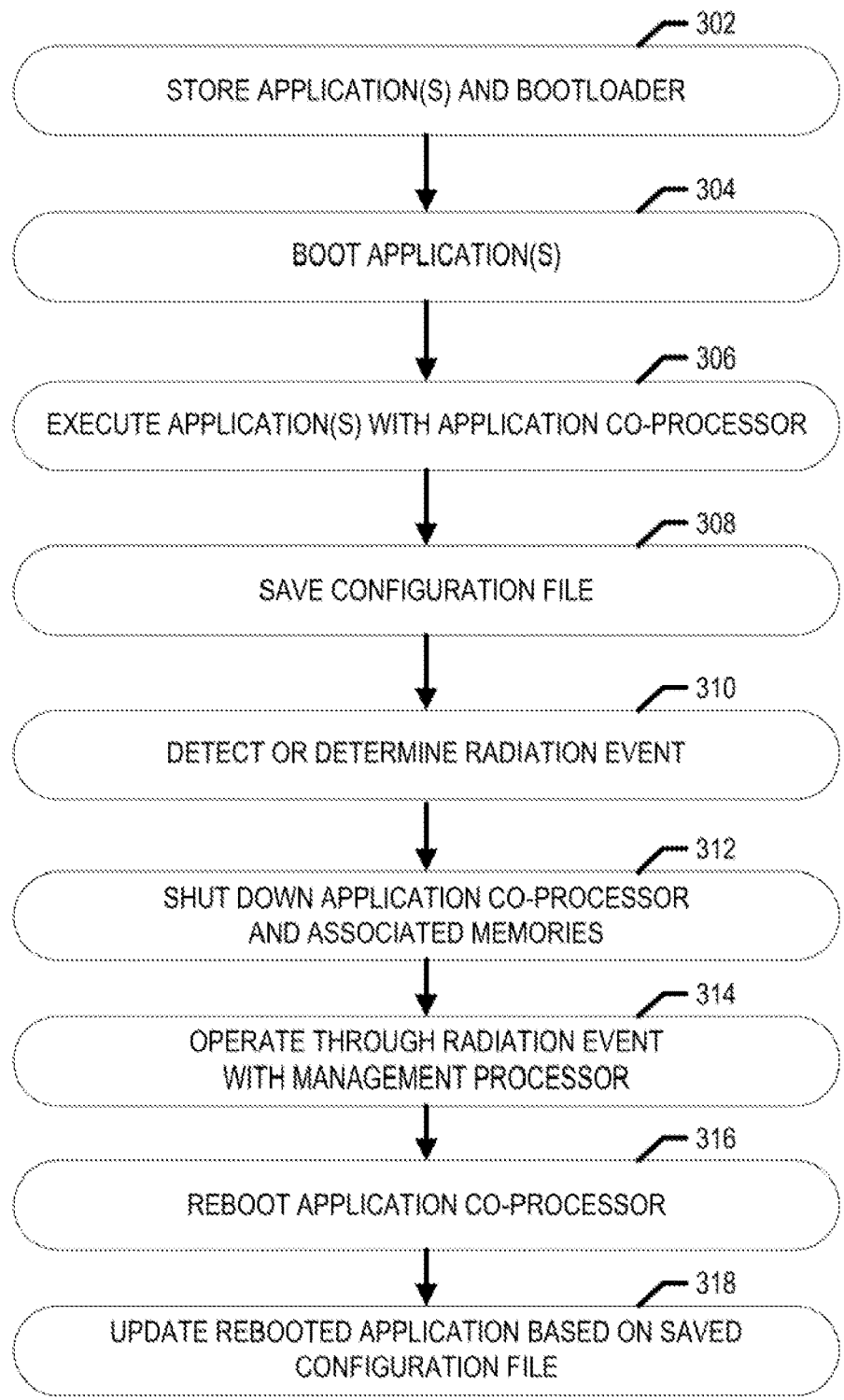
Figure 4:
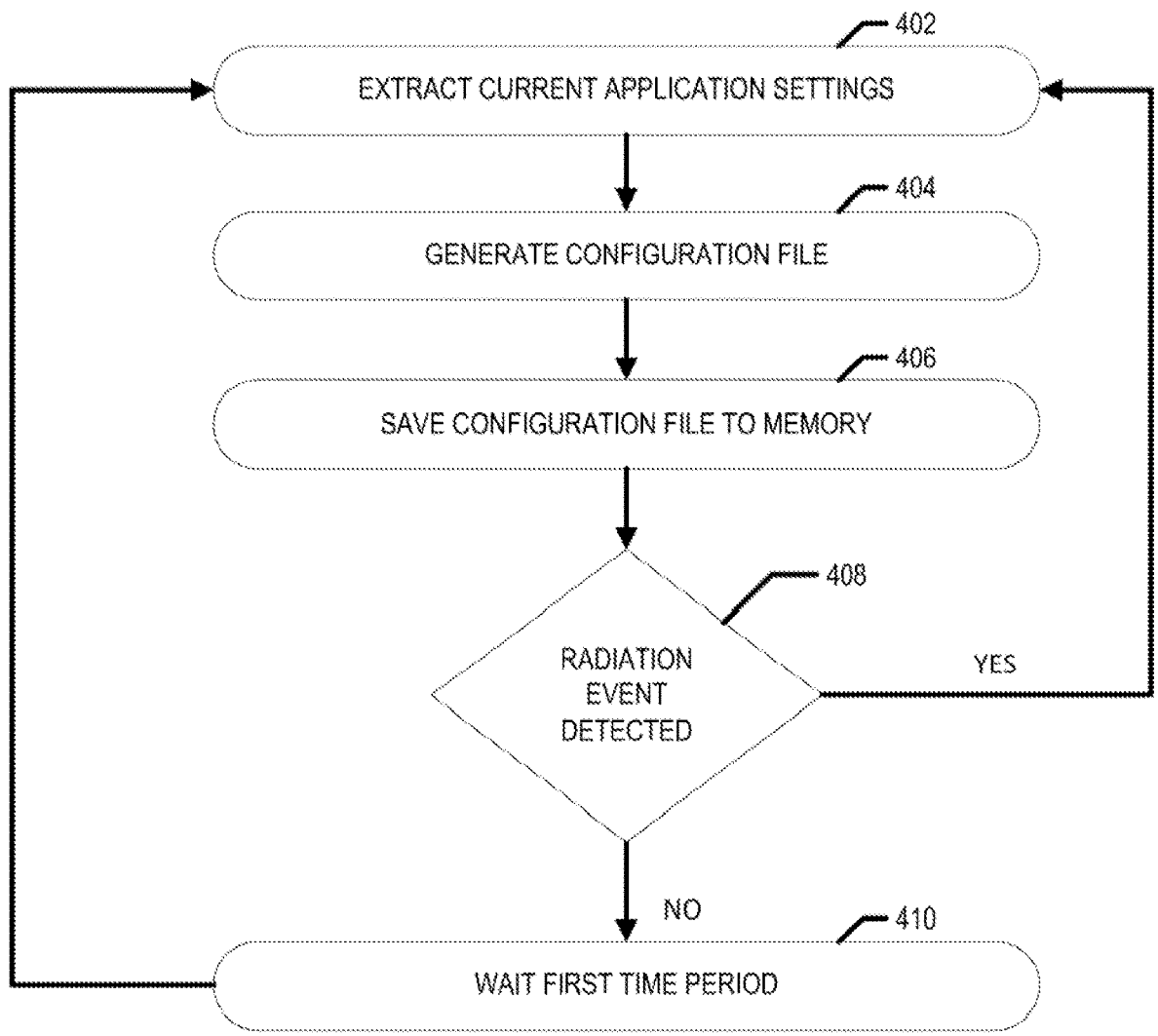
Figure 5:
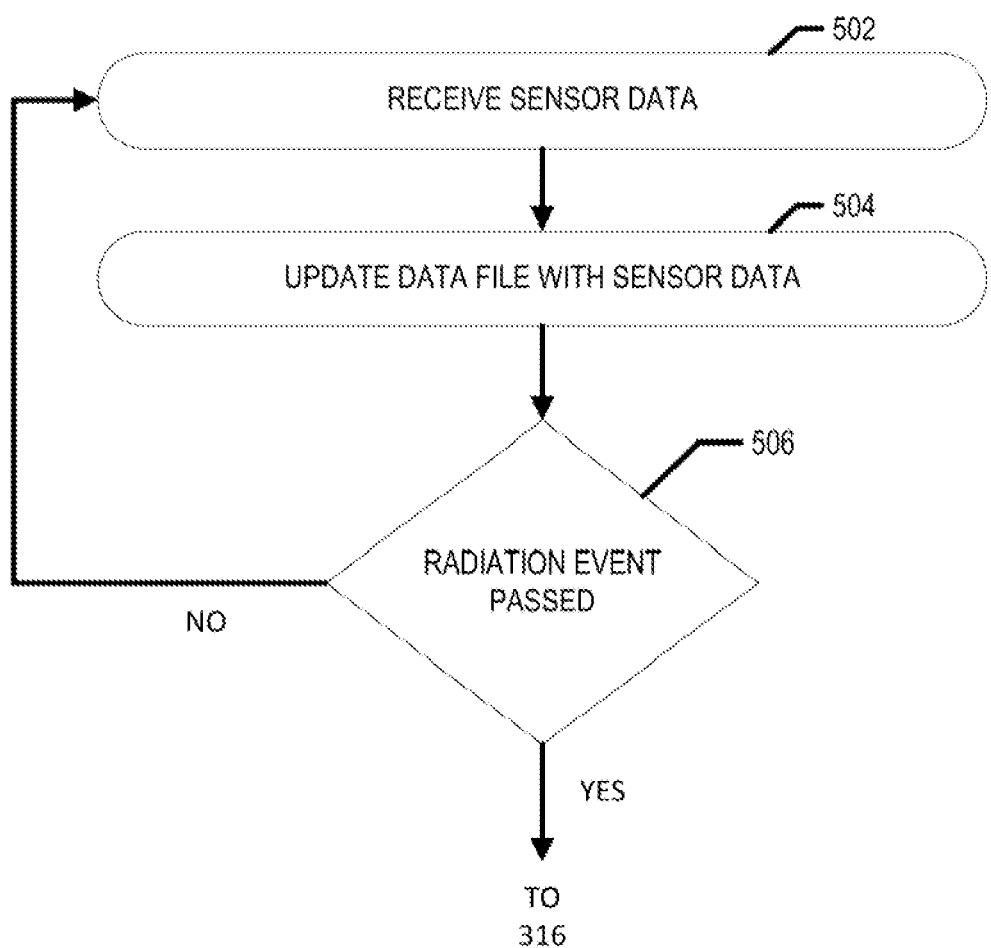
Figure 6:
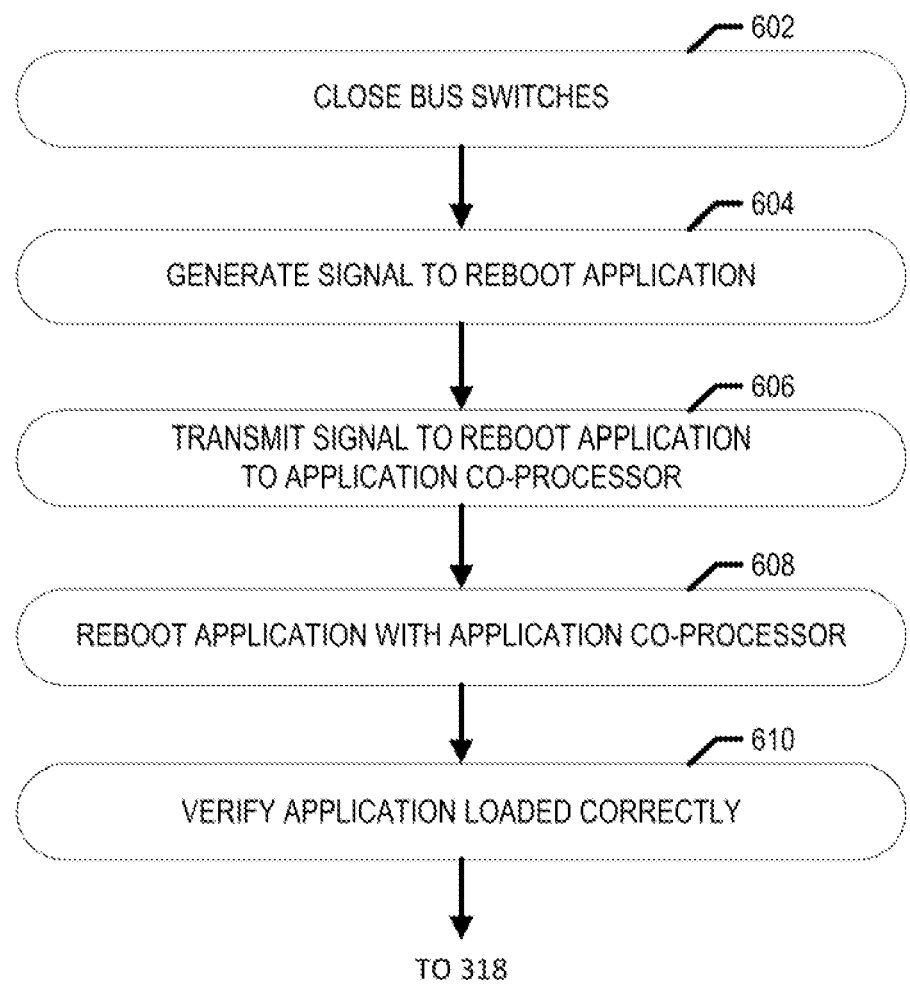

Having thus described certain example embodiments of the present disclosure in general terms, reference will now be made to the accompanying drawings, which are not necessarily drawn to scale, and wherein:

FIG. 1A illustrates a first block diagram of an example dual processor single board computer in accordance with one or more embodiments of the present invention;

FIG. 1B illustrates a second block diagram of an example dual processor single board computer in accordance with one or more embodiments of the present invention;

FIG. 2 illustrates an block diagram for powering components of an example dual processor single board computer in accordance with one or more embodiments of the present invention;

FIG. 3 illustrates a flowchart according to an example method for operating an example dual processor single board computer in accordance with one or more embodiments of the present disclosure;

FIG. 4 illustrates a flowchart according to an example method for saving configuration files in accordance with one or more embodiments of the present disclosure;

FIG. 5 illustrates a flowchart according to an example method for operating during a radiation event in accordance with one or more embodiments of the present disclosure; and FIG. 6 illustrates a flowchart according to an example method for rebooting an example dual processor single board computer after a radiation event in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure satisfies applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry.

The terms "electrically connected," "electronically coupled," "electronically coupling," "electronically couple," "in communication with," or "in electronic communication with," in the present disclosure refers to two or more elements, modules, circuitry, or components being connected through wired means and/or wireless means, such that signals, electrical voltage/current, data and/or information may be transmitted to and/or received from these elements or components.

Overview

Various embodiments of the present invention are directed to improved apparatuses, systems, and methods for dual processor single board computers. The dual processor single board computers described herein include a single board computer with a management processor and an application co-processor. The management processor is comprised of and associated with radiation hardened processor circuitry. The application co-processor is comprised of and associated with high performance processor circuitry. As described herein, the inclusion of the radiation hardened management processor and the high performance application co-processor allows for the dual processor single board computer of the present invention to provide high performance processing for execution of applications as well as for management of the dual processor single board computer to operate through one or more radiation events. Thus, the present invention described herein may also be described as high performance radiation tolerant dual processor single board computers.

Dual processor single board computers described herein may be included in a system or device, such as a satellite, space craft, aircraft, drone, rocket, projectile, or other guided device or guided system, which will be referred to herein as a device or system. A radiation event may cause the device to be exposed to radiation, and possibly a high dose of radiation. Exposure to radiation may cause sensors and/or peripherals of the device, such as guidance control computers, and more specifically the electrical components therein, to be damaged. Such damage may partially or fully destroy an electrical component and/or corrupt stored data, which may render the device, a sensor, or peripheral inoperable or only partially functional.

Certain electrical components of a dual processor single board computer described herein, including processors and associated memory, may be radiation hardened. Radiation hardening makes electronic components resistant to damage caused by radiation, including allowing the radiation hardened (a.k.a., rad-hard) electrical components to be exposed to higher total doses of radiation before damage occurs. The amount of radiation a radiation hardened electrical component may safely be exposed to and undamaged is higher than a non-radiation hardened component. The amount of radiation, to which an electrical component may be exposed, may be measured in rads, which is a unit of absorbed dose of ionizing radiation.

For non-radiation hardened components, the amount of radiation that these components may be exposed to before being damaged may be increased by isolating the component, such as by removing the components' connections to a power source and to ground. By controlling such isolation the present invention provides high performance non-radiation hardened components that may be isolated during radiation events to allow for their survival during a radiation event and continued operation after the radiation event has passed.

In various embodiments, an application executed on the application co-processor may, for example, track or direct the device (e.g., satellite) as well as track another system, device, or object. As an example, a dual processor single board computer may operate as a flight controller of a satellite to track and direct the path of the satellite while also tracking one or more objects in space, such as a star, comet, another satellite, etc. Operating as a flight controller may include executing a flight software application for controlling the satellite as it follows its trajectory at a certain speed for its mission. For example, the device of a satellite may be on a mission to intercept an object of a comet, and the dual signal board controller may control the flight of the system so that the system reaches its destination. While on its path, the system may be exposed to radiation event(s).

Various radiation events may include a solar flare, cosmic rays, gamma ray bursts, an electromagnetic pulse (EMP), or other events that generate radiation, which may be natural or man-made. In various embodiments, the radiation event may generate high doses of radiation, such as radiation exposure that exceeds several 100,000 s of kilorads or radiation delivered in the fraction of a second. Certain radiation events may be detected early, such as certain solar flares being detected at a distance with radio telescopes or cameras. Radiation events that may be detected early may allow for the determination of a time to isolate and/or shut down non-radiation hardened electrical components of the dual processor single board computer as well as other portions of the device. For example, a solar flare detected by a camera or another system peripheral at a distance may allow for the determination of a time based on how solar particles travel at a known, measured, or estimated velocity and, thus, a determination of a time until the device may be exposed to the radiation from the radiation event may be determined. Additionally, it may similarly be determined how long such a radiation event may expose the device with the dual processor single board computer to the radiation from the radiation event, which allows for a determination of a time period required for shutting down and/or isolating the non-radiation hardened electrical components before rebooting those components. It is appreciated that there is a desire to minimize the time any portion of the system is down due to radiation events. Additionally, one or more sensors and/or peripherals may be operational during the radiation event to generate readings or measurements, which may include a radiation sensor measurement of radiation received, which may be used for determining when the radiation exposure has been reduced to operational levels.

Once the radiation from the radiation event has passed, a radiation hardened management processor of the dual processor single board computer, which has been operating through the radiation event, reconnects electrical components previously isolated to power sources and ground and reboots the applications that were shut down prior to or during the radiation event. As described herein, this allows for the device to quickly recover from the partial shutdown and resume operations with minimal interruption.

It should be readily appreciated that the embodiments of the apparatus, systems, and methods described herein may be configured in various additional and alternative manners in addition to those expressly described herein.

Exemplary Apparatus and System

Embodiments of the present invention herein include a dual processor single board computer that provides for high performance and radiation tolerance.

FIG. 1A illustrates a first block diagram of an example dual processor single board computer 100 in accordance with one or more embodiments of the present invention. The dual processor single board computer 100 may include a management processor 110 and an application co-processor 120, which may be mounted on a single board 106, such as a printed circuit board or the like.

The management processor 110 may be associated with and electrically connected to a plurality of memories, including a first memory 130 and a second memory 140. The application co-processor may be associated with and electrically connected to a plurality of memories, including a third memory 150 and a fourth memory 160.

In various embodiments, the dual processor single board computer 100 may include a single printed circuit board 106 with a backplane 102 and a front panel 104. The backplane 102 may include one or more backplane connectors, and the front panel 104 may include one or more front panel connectors. The management processor 110 may be connected to one or more of the backplane connectors on the backplane 102, and the management processor 110 may be connected to one or more front panel connectors on the front plane 104. The application co-processor 120 may be connected to one or more of the backplane connectors on the backplane 102, and the application co-processor 120 may be connected to one or more front panel connectors on the front plane 104. In various embodiments, one or more backplane connectors and one or more front panel connectors may be connected to each of the management processor 110 and the application co-processor 120. The backplane connectors and the front panel connectors may allow for the dual processor single board computer 100 to be connect to additional portions (e.g., sensors, peripherals, etc.) of a device or system in which the dual processor single board computer 100 is installed.

The management processor 110, although illustrated as a single block in FIG. 1, may be comprised of a plurality of components and/or processor circuitry. The management processor 110 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements (including integrated circuits, such as ASICs, FPGAs, systems-on-a-chip (SoC), or a combination thereof). In various embodiments, the management processor 110 may be configured to execute applications, instructions, and/or programs stored in the first memory 130, the second memory 140, a processor memory cache, or otherwise accessible memory by the management processor 110. When executed by the management processor 110, these management applications, instructions, and/or programs may enable the execution of one or a plurality of the operations and/or functions described herein. Regardless of whether it is configured by hardware, firmware/software methods, or a combination thereof, the management processor 110 may comprise entities capable of executing operations and/or functions according to the embodiments of the present invention when correspondingly configured. Therefore, for example, when the management processor 110 is implemented as an ASIC, an FPGA, SoC, or the like, the management processor 110 may comprise specially configured hardware for implementing operations and/or functions described herein.

The application co-processor 120, although illustrated as a single block in FIG. 1, may be comprised of a plurality of components and/or processor circuitry. The application co-processor 120 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements (including integrated circuits, such as ASICs, FPGAs, systems-on-a-chip (SoC), or a combination thereof). In various embodiments, the application co-processor 120 may be configured to execute application, instructions, and/or programs stored in the third memory 150, the fourth memory 160, a processor memory cache, or otherwise accessible memory by the application co-processor 120. When executed by the application co-processor 120, these applications, instructions, and/or programs may enable the execution of one or a plurality of the operations and/or functions described herein. Regardless of whether it is configured by hardware, firmware/software methods, or a combination thereof, the application co-processor 120 may comprise entities capable of executing operations and/or functions according to the embodiments of the present invention when correspondingly configured. Therefore, for example, when the application co-processor 120 is implemented as an ASIC, an FPGA, SoC, or the like, the application co-processor 120 may comprise specially configured hardware for implementing operations and/or functions described herein.

In various embodiments, the application co-processor 120 may include cache memory, memory controllers, and a plurality of interfaces, such as those described herein. The application co-processor 120 may include a greater number of interfaces for connecting with sensors, peripherals, and or other computers of a device than on the management processor 110, which may allow the application co-processor to be configured to provide additional capabilities than the management processor 110. Additionally, as radiation hardening may require additional physical space on a processor, the application co-processor 120 not being radiation hardened or not being as radiation hardened as the management processor 110 may allow for the application co-processor 120 to include additional electrical components to improve performance, such as a dual core processors and/or expanded processor cache memory.

In various embodiments, the performance of a processor may be measured in D-MIPS, and the high performance co-processor 120 may operate at greater than 10,000 D-MIPS while the management processor 110 may operate at approximately 120 D-MIPS.

In various embodiments, the management processor 110 may be an system on a chip (SoC). In various embodiments, the application co-processor 120 may be an FPGA. The management processor 110 of an SoC may be radiation hardened, though it may be, in various embodiments, configured and/or capable of lower DMIPS than the application co-processor, such as the management processor 110 being configured and/or capable of 120 DMIPS. The application co-processor 120 may be capable of up to or exceeding 20,000 DMIPS, though such an application co-processor may not be radiation hardened. Additionally, the first memory 130 may be a MRAM, such as 8 MB of MRAM, the second memory 140 may be SDRAM, such as 256 MB of SDRAM, the third memory 150 may be SDRAM, such as 4 GB of DDR4 SDRAM, and the fourth memory 140 may be comprised of a first NOR flash memory 140A and a second NOR flash memory 140B, each of which may be 1 GB in size. Thus, in various embodiments, the management processor 120 may be associated with a first memory 130 and a second memory 140, which may have a lower performance than the application co-processor 120 and associated third memory 150 and fourth memory 160.

The memory 130, 140, 150, 160 may comprise, for example, a volatile memory, a non-volatile memory, or a combination thereof. Although each of memory 130, 140, 150, 160 are illustrated as a single memory, each may comprise a plurality of memory components and/or memory circuitry. In various embodiments, each memory may comprise, for example, a random access memory, a flash memory, a cache memory, a hard disk drive, an optical disk, a circuit configured to store information, or a combination thereof. The memory 130, 140, 150, 160 may each be configured to store data, information, applications, programs, instructions, etc., so that the management processor 110 and/or application co-processor 120 may execute various operations and/or functions according to the embodiments of the present disclosure.

In various embodiments, the first memory 130 may be a radiation hardened memory and the second memory 140, the third memory 150, and the fourth memory 160 may be non-radiation hardened memory. For example, the management processor 110 and associated first memory 130 may be radiation hardened to survive up to 1 M-rad of radiation or more.

The first memory 130 may be radiation hardened bootable memory. In various embodiments, the first memory 130 may be MRAM, which may have a higher radiation tolerance than, for example, SDRAM, DDR4 SDRAM, NOR flash, etc.

In various embodiments, the first memory 130 may be a radiation hardened memory but may be slower than other memories. Thus the first memory 130 may be loaded with a boot loader and one or more management application files to load on boot up. The first memory 130 may also include one or more data files and/or configuration files that may be updated during a radiation event to record data generated by sensors, peripherals, or other computers of a device so that this data may be readily available to one or more applications executed by the application co-processor 120 once it is rebooted.

In various embodiments, one of the third memory 150 or the fourth memory 160 may be associated with one or more applications executed by the application co-processor 120. For example, the third memory 150 may be DDR4 SDRAM that may be for performing calculations and the fourth memory 160 may be NOR flash used for storing data files and/or configuration files associated with one or more applications executed by the application co-processor 120.

In various embodiments, the memories 130, 140, 150, and 160 may be configured for encryption such that data and/or files saved in the memories 130, 140, 150, and 160 may be encrypted. To access the data and/or files stored on the memories 130, 140, 150, and 160, the data and/or files are first decrypted, which might also be verified or checked to confirm that the data and/or files has not been corrupted, such as from radiation from a radiation event. Such verification may occur prior to execution of the executing or rebooting the application on the application co-processor 120.

In various embodiments, the management processor 110 may be configured to manage the dual processor single board computer 100, including operating bus switches to isolate one or more components or portions of the dual processor single board computer 100 or booting (and rebooting) one or more applications executed by the application co-processor 120. For example, the management processor 110 may be configured to, on power being provided to the system, execute a boot loader. The management processor 110 and/or the boot loader may be configured to load a software image from a memory, which may include loading data and/or configuration files saved to memory. In various embodiments, the management processor 120 may only be responsible for booting and/or rebooting the device. Otherwise the management processor 110 may operate in a low power or standby mode to save power while the application co-processor 120 is running. Alternatively, or additionally, the management processor 110 may be monitoring, polling, and/or receiving signals from one or more sensors and/or the application co-processor 120 to detect and/or determine a radiation event has occurred. The management processor 110 may use the first memory 130, the second memory 140, and a management processor cache memory to execute one or more management applications, which may include booting or rebooting an application or the execution of an application on the application co-processor 120 and/or storing and/or updating data and/or configuration files.

FIG. 1B illustrates a second block diagram of an example dual processor single board computer 100 in accordance with one or more embodiments of the present invention.

The example dual processor single board computer 100 illustrated in FIG. 1B includes a management processor 110 comprised of a processor 112 and a cache memory 114. The management processor 110 is further comprised of a first memory controller 116, a second memory controller 117, a plurality of interfaces 118A-D, and a processor-to-processor interface 119. The first memory controller 116 may be electrically coupled to the first memory 130, and the second memory controller 117 may be electrically coupled to the second memory 140.

The example dual processor single board computer 100 illustrated in FIG. 1B also includes an application co-processor 120 comprised of a first processor 122A, a second processor 122B, and an application co-processor memory 124. The application co-processor 120 is further comprised of a third memory controller 126, a fourth memory controller 127, a plurality of interfaces 128A-H, and a processor-to-processor interface 129. The third memory controller 126 may be electrically coupled to the third memory 150. The fourth memory controller 127 may be electrically coupled to the fourth memory 160, which may comprised of two memories 160A and 106B.

In various embodiments, the one or more interfaces 118A-118D of the management processor 110 may each be electrically connected to an associated connector on the backplane 102. Similarly, the one or more interfaces 128A-128H of the application co-processor 120 may each be electrically connected to an associated connector on the backplane 102. The interfaces 118A-D and the interfaces 128A-H may include one or more of high bandwidth memory (HBM), low voltage differential signaling (LVDS), 3.3V, 112 Gb/s, 58 Gb/s, 32 Gb/s, Ethernet (e.g., Nx 100G Ethernet, etc.), 1553, serial peripheral interface (SPI), universal asynchronous receiver-transmitter (UART), or the like.

For example, the interfaces 118A-118D may be configured such that: interface 118A may be CAN 2.0 interface; interface 118B may be 1553 interface; interface 118C may be SPI interface; and interface 118D may be UART interface.

As a further example, the interfaces 128A-128H may be configured such that: interface 128A may be an HBM interface; interface 128B may be an LVDS interface; interface 128C may be an 3.3V GPIO interface; interface 128D may be an 112 Gb/s interface; interface 128E may be an 58 Gb/s interface; interface 128F may be an 32 Gb/s interface; interface 128G may be an Nx 100G Ethernet interface; and interface 128H may be an Direct RF interface. It will be appreciated that each interface may use a connector specific to the specific type of interface.

In various embodiments, the interfaces 118, 128 may allow for the receipt of large amounts of data and/or files from sensors, peripherals, and other computers of the device through a backplane connector and/or a front panel connector. In various embodiments, an application co-processor 120 may receive one or more inputs, data, and/or files from a sensor or a peripheral through one or more interfaces 128, which may allow for the device (e.g., a satellite) to control for a trajectory associated with the system. The inputs, data, and/or files received may be processed and/or stored with a memory associated with the application co-processor 120, such as the third memory 150, the fourth memory 160, and/or the application co-processor memory 124. The application co-processor 120 may include a third memory controller 126 to control the operation of the third memory 150 and a fourth memory controller 127 to control the operation of the fourth memory 160.

In various embodiments, a processor-to-processor interface 119 of the management processor 110 and the processor-to-processor interface 129 of the application co-processor 120 may be electrically connected, and these processor-to-processor interfaces 119, 129 may also be electrically connected to either the backplane 102, the front panel 104, or to both the backplane 102 and the front panel 104.

FIG. 2 illustrates an block diagram for powering components of an example dual processor single board computer 100 in accordance with one or more embodiments of the present invention. FIG. 2 illustrates a first power source 202A and a second power source 202B. In various embodiments, the first power sources 202A and the second power source 202B may be connected to the dual processor single board computer 100 through the backplane 102 and/or the front panel 104.

FIG. 2 further illustrates bus switches 210A-E, which may be electrically connected to a power source and one or more of the components of the dual processor single board computer to separate the component(s) from the power source. The bus switches 210 may be radiation hardened bus switches.

In the embodiment illustrated in FIG. 2, a first power source 202A may be electrically connected to the management processor 110, the first memory 130, and the second memory 140. The management processor 110, the first memory 130, and the second memory 140 may also be electrically connected to a first ground 220A. A second power source 202B may be electrically connected to the application co-processor 120, the third memory 150, and the fourth memory 160. The application co-processor 120, the third memory 150, and the fourth memory 160 may also be electrically connected to a second ground 220B.

In various embodiments, the first power source 202A and the second power source 202B may be distinct power sources. For example, they may be a combination of a primary power source, a secondary power source, a backup power source, or the like. In various embodiments, the power sources 202A and 202B may be connected together, such as via a bus switch (not illustrated), which may include turning on or off one of the power sources 202A, 202B if both are connected together. Additionally, while FIG. 2 illustrates a power source 202A and a power source 202B, the power sources may be located off the dual processor single board computer 100 and connectors for connecting to each power source may be located on the backplane 102 and/or the front panel 104.

The first ground 220A and the second ground 220B may be separate grounding points on the dual processor single board computer 100. Alternatively, each ground 220 may be electrically connected such that each are grounded together. Additionally, or alternatively, each ground 220 may be electrically connected to a connector on the backplane 102 and/or the front panel 104, and such electrical connections may be isolated from other connectors and configured to connect to a device ground, which may be a device chassis.

As illustrated in FIG. 2, the management processor 110 and the first memory 130 are electrically connected to each of the first power source 202A and the first ground 220A without a bus switch 210.

A first bus switch 210A may be electrically connected to the first power source 202A and the second memory 140, specifically a first terminal of the first bus switch 210A may be electrically connected to a first power source 202A and a second terminal of the first bus switch 210A may be electrically connected to the second memory 140. A second bus switch 210B may be electrically connected to the second memory 140 and a first ground 220A, specifically a first terminal of the second bus switch 210B may be electrically connected to the second memory 140 and a second terminal of the second bus switch 210B may be electrically connected to the first ground 220A. By operating the first bus switch 210A and the second bus switch 210B to open, the second memory 140 may be isolated from the first power source 202A and the first ground 220A. By operating the first bus switch 210A and the second bus switch 210B to close, the second memory 140 may be electrically connected to the first power source 202A and the first ground 220A.

As also illustrated in FIG. 2, the application co-processor 120 may be connected to the second power source 202B and the second ground 220B. The connection of the application co-processor 120 to the second power source 202B may be through one or more bus switches 210, illustrated as the third bus switch 210C. The connection of the application co-processor 120 to the ground 220B may be through a fifth bus switch 210E.

As also illustrated in FIG. 2, the third memory 150 and the fourth memory 160 may each be connected to the second power source 202B and the second ground 220B. The connection of the third memory 150 and the fourth memory 160 to the second power source 202B may be through one or more bus switches 210, illustrated as the fourth bus switch 210D. The connection of the third memory 150 and the fourth memory 160 to the ground 220B may be through a sixth bus switch 210F.

Specifically, and as illustrated, a first terminal of the third bus switch 210C is electrically connected to the second power source 202B and a second terminal of the third bus switch 210C is electrically connected to the application co-processor 120. A first terminal of the fourth bus switch 210D is electrically connected the second power source 202B and a second terminal of the fourth bus switch 210 is electrically connected to both the third memory 150 and the fourth memory 160. A first terminal of the fifth bus switch 210E is electrically connected to the application co-processor 120 and a second terminal of the fifth bus switch 210E is electrically connected to a ground 220B. A first terminal of the sixth bus switch 210F is electrically connected to the third memory 150 and the fourth memory 140, and a second terminal of the sixth bus switch 210F is electrically connected to a ground 220B.

By operating the third bus switch 210C, the fourth bus switch 210D, the fifth bus switch 210E, and the sixth bus switch 210F to open, the application co-processor 120, the third memory 150 and the fourth memory 160 may be isolated from the second power source 202B and the second ground 220B. By operating the third bus switch 210C, the fourth bus switch 210D, the fifth bus switch 210E, and the sixth bus switch to close, the application co-processor 120, the third memory 150 and the fourth memory 160 may be electrically connected to the second power source 202B and the second ground 220B.

In various embodiments, one or more of the bus switches illustrated 210A-F may be included in or part of a multichannel bus switch. In a multichannel bus switch, multiple channels are included, and each channel may be operated separately or in conjunction with other channels of the multichannel bus switch. For example, a first and a second channel may be operated to be opened together and/or operated to be closed together. Thus, control of the multichannel bus switch may provide a signal to the multichannel bus switch controlling the operation of the channels, such as opening and closing any or all of the individual channels. Additionally, an electrical connection between two components through the multichannel bus switch may utilize more than one channel in parallel. Utilizing more than one channel may be advantageous if a single channel has a current rating that should not be exceed. Connecting a plurality of channels in parallel allows for the total current from a first component to a second component to be divided among the number of channels used, which lowers the current passed through any individual channel.

For example, a multichannel bus switch may include 32 bus switches 210. The first bus switch 210A may be first channel, the second bus switch 210B may be the second channel, the third bus switch 210C may be the third channel, the fourth bus switch 210D may be the fourth channel, the fifth bus switch 210E may be a fifth channel, and the sixth bus switch 210F may be a sixth channel. In such an embodiment, controlling the individual multichannel bus switch, including controlling the individual channels to open and close, the electrical components may be isolated or connected to power sources 202 and grounds 220.

In various embodiments, the opening of bus switches 210 may allow for radiation sensitive components to be disconnected from both a power source 202 and ground 220 during a radiation event, which may protected them from the radiation. Specifically, as illustrated in FIG. 2, the operation of bus switches 210 to open the bus switches 210 allows for the application co-processor 120, the second memory 140, the third memory 150, and the fifth memory 160 to be isolated from the power source(s) and the ground(s). The isolation of these electrical components may allow for the amount of total dose radiation received during an event to be safely increased, compared to when not isolated, and such an increase may allow the electrical components to survive a radiation event without damage. For example, a memory of NOR flash memory may have an approximate total dose radiation rating of 15 kilorads when the NOR flash memory is powered, which may be increased to approximately 30 kilorads when isolated from a power source 202 and a ground 220.

In contrast, the radiation hardened management processor 110 and first memory 130 remain connected to the power source 202 and the ground 220, and thus the management processor 110 and first memory 130 may continue to operate through a radiation event. The management processor 110 may be configured to operate in a safe mode and execute an application that controls the operation of the bus switches 210 to open and close.

In various embodiments, the management processor 110 may also control operation of one or more sensors, peripherals, cards, electrical components, other computers, or the like of a device to similarly cause them to power down during a radiation event. For example, a satellite may include the dual processor single board computer 100 of the present invention and a sensor. On detection and/or determination of a radiation event (e.g., a solar flare), the dual processor single board computer 100, specifically the management processor 120, may control operation of the sensor, including any associated switches, to isolate the sensor from power and ground to increase the total dose radiation the sensor may receive before being damaged. The management processor 110 may, on detection and/or determination that the radiation event has passed, control operation of the sensor or satellite to power up and reboot the sensor, which may include operation of switches and/or loading of software to reboot, test, update, and/or reconfigure the sensor and/or operation of the satellite.

Sensors may include radiation detectors, cameras, electromagnetic sensors, navigational sensors, focal point sensors, thermal sensors, optical sensors, etc. Radiation detectors may detect radiation levels at the sensor or at some distance from the sensor. A camera may be capable of imaging more than the visible light spectrum, such as an infrared camera or an ultraviolet camera. The camera be used to detect light from a distance way. Some or all of a sensor may be incorporated into and/or coupled with or connected to the dual processor single board computer 100. Electromagnetic sensors may detect an electromagnetic reading at the device or some distance from the sensor. Additionally, or alternatively, sensor data may be generated by a sensor located off the dual processor single board computer that may be transmitted to the dual processor single board computer 100, such as through a connector on the backplane 102 or the front panel 104, which may be received by the application co-processor 120 and/or the management processor 110 via one or more interfaces. Data from the sensors or peripherals may be used to detect a radiation event and trigger a shutdown or be used to determine when to shut down by the dual processor single board computer 100.

In various embodiments, not illustrated, one or more bus switches 210 may be connecting between the management processor 110 and its associated memories (e.g., 130, 140), and one or more bus switches 210 may be connecting the application co-processor 120 and its associated memories (e.g., 150, 160).

In various embodiments, such as where the application co-processor 120 executes one or more applications, isolating the application co-processor 120 and the associated third memory 150 and fourth memory 160 causes these components to cease operating. Thus it shuts down these components. While they are critical to the functioning of an application, shutting them down allows them to survive a radiation event and be rebooted.

Having generally described embodiments in accordance with the present invention, several exemplary operations according to exemplary embodiments will be described.

Exemplary Operations

In some example embodiments, and according to the operations described herein, a dual processor single board computer 100 may be used to operate through a radiation event as described herein. While the following flowcharts and related descriptions include multiple operations, it is readily appreciated that some of the following operations may be omitted, some of the operations may be repeated or iterated, and that additional operations may be included. Additionally, the order of operations should not be interpreted as limiting as the order of these operations may be varied.

FIG. 3 illustrates a flowchart according to an example method for operating an example dual processor single board computer in accordance with one or more embodiments of the present disclosure.

At operation 302, applications and a bootloader are stored. An application (e.g., flight software image) and a bootloader may be stored in a memory associated with the application co-processor 120, such as in the fourth memory 160, which may be a NOR flash memory. In various embodiments, the fourth memory 160 may be a secure and/or encrypted memory, which may be for storing the application in a secure or encrypted format.

At operation 304, application(s) are booted. The dual processor single board computer 100 may boot the application from memory, such as the fourth memory 160, which may occur at startup or in response to a management application. In various embodiments, the application booted up may be executed by the application co-processor 120 and may include programming, loading, and/or executing a management application on the management processor 110. The management application may be stored or loaded to a first memory 130, which may be MRAM. In various embodiments, the management application may be comprised of a back-up or safe-mode application. Thus, when the application is started, the application co-processor 120 may load one or more application data and/or files to a memory associated with the management processor 110 for the management processor 110 to execute or run.

In various embodiments, the application may be booted or started at the start of a mission, such as a satellite's mission. On mission launch, the application co-processor 120 may run the bootloader, decrypt the application and related data and files, boot the application, which may copy and/or load safe-mode files to the first memory 130 associated with the management processor 110 for execution by the management processor 110.

At operation 306, the application co-processor executes the application(s), which may be controlling a device (e.g., a satellite), and the management processor 110 may be executing one or more management application(s).

At operation 308, a configuration file is saved. The configuration file may be comprised of, as of the time of saving, the current configurations of the system or device. Thus the configuration file may be referred to as a good configuration. The most recent of these files may be referred to as the last known good configuration file, which may store the last known good configuration.

During normal operation the configuration files may be saved at regular intervals, such as after a time period. Additionally, or alternatively, a configuration file may be saved in response to the detection and/or determination of a radiation event. Such a detection and/or determination may be based on one or more sensors detecting a radiation event, which may be communicated to the dual processor single board computer 100 with the receiving of one or more sensor signals via an interface on the backplane 102 or the front panel 104.

The configuration file may be saved to the fourth memory 160, which in various embodiments may be NOR flash memory for use when the application is rebooted (e.g., at operation 318). During a radiation event, the fourth memory 160 may be shut down and isolated. This may increase the amount of radiation the fourth memory 160 may receive before being damaged. Damage received by a memory (e.g., fourth memory 160) may include, but is not limited to, changing the bits of stored data and or files, which may corrupt the stored data and/or files.

In various embodiments, multiple configuration files may be saved, and each configuration file may be associated with a timestamp, such as in metadata, the file name, the configuration file, or the like. Alternatively, a configuration file may be updated such that there is only one configuration file and, thus, the single configuration file is the last known good configuration file. In various embodiments, the single configuration file may be iteratively updated after the expiration of a time period (e.g., a second, minute, or hour). Alternatively, or additionally, an iterative update of the configuration file may be after or based on a measurement or reading of a sensor associated with an application. For example, each time a radiation sensor measures a radiation level then the configuration file may be updated.

The configuration file(s) may also include a reference, pointer, link, or the like to one or more data files. A data file may include the history of data generated and saved from one or more sensors. For example, a satellite traveling may store historical data in a data file and a configuration file may reference the historical data and/or use the data file to generate statistics used by the application co-processor 120, such as determining a current location and trajectory.

At operation 310, a radiation event is detected or determined. The detection and/or determination may be based on one or more signals received by the dual processor single board computer 100, such as from a sensor or peripheral that communicates with the application co-processor 120 and/or management processor 110 via one or more interfaces 128, 118.

At operation 312, the application co-processor 120 is shutdown. To shut down the application co-processor 120 as well as associated memories, the management processor 110 opens bus switches 210 to isolate the application co-processor 120. One or more bus switches 210 may be operated to open the bus switches 210 to isolate one or more components of the dual processor single board computer 110. In various embodiments, one or more shut down signals may be transmitted from the management processor 110 to the application co-processor 120 prior to opening the bus switches 210, and the shut down signals may cause an application to save or shut down.

In particular, as part of shutting down the application co-processor 120, the management processor 110 may generate a signal or command transmitted to and received by the application processor 120 to cause a new configuration file to be saved and to cause an application to cease operations before one or more bus switches 210 are opened. Similarly, the management processor 110 may generate one or more signals transmitted to a sensor, peripheral, or computer of the system to cause operations to cease and those sensors, peripherals, and/or computer to shut down.

In the embodiment illustrated in FIG. 2, the management processor 110 operates the bus switches 210A-F to isolate the second memory 140, application co-processor 110, third memory 150, and fourth memory 160 from the power supplies 202 and grounds 220. While these components of the dual processor single board computer 100 are isolated they are not operational. With the bus switches 210 opened, the isolated components of the dual single board use computer may be capable of safely receiving a higher total dose of radiation from a radiation event without being damaged.

At operation 314, the management processor 110 operates through the radiation event. In various embodiments, the management processor 110 may execute one or more management operations that may detect and/or determine when the radiation event has passed.

In various embodiments, the management processor 110 may continue to receive data from one or more sensors and/or peripherals of the system or device. For example, a satellite may continue to receive readings from a radiation detector as well as other sensors, peripherals, and/or computers. When the reading drop below a threshold, the management processor 110 may reboot other components. For example, a satellite may include a radiation sensor that continues to take readings, and once the measured radiation in the readings fall to a radiation event threshold or a radiation level threshold associated with normal operation then the device may proceed to operation 316.

While operating through the radiation event, the management processor 110 may also continue to receive sensor and/or peripheral data and store this data to a data file and/or configuration file. This may include polling sensors and/or peripherals to have the sensor and/or peripheral provide the data. The data acquired during the operate through period may be used to reboot, realign, and/or update an application or the device when rebooted. This may include allowing for a handoff of receiving and monitoring sensor data from the management processor 110 to the application co-processor 120. In various embodiments, the management processor 110 may operate at a lower performance level than the application co-processor 120 running an application, and this may include receiving sensor data at a slower rate, storing sensor data received at greater time intervals, or the like. Thus handing off the receiving and monitoring of sensor data back to the application co-processor 120 may be a part of restoring operations to normal.

For example, a satellite may have a management processor 110 continue to collect trajectory data, velocity data, and the like from sensors and/or peripherals, which may provide that data to the management processor 110. When the application that may utilize this data under normal operations is rebooted, the application co-processor 120 may utilize the data received and stored by the management processor 110 while operating through the radiation event in addition to the last known good configuration file to update the application and/or device. This may assist the satellite in determining the satellite's trajectory and velocity after the radiation event has passed and any correction that may need to be made to continue or get back on mission.

At operation 316, the application processor 110 is rebooted. In various embodiments, rebooting the application processor 110 includes operating the bus switches 210 to close, which would connect the isolated components to power and ground. The rebooting may also include communicating with the application co-processor 120 to cause the application co-processor 120 to load or reload one or more applications.

In various embodiments, the rebooting may including causing the application loaded or reloaded by the application co-processor 120 to load data from the last known good configuration file and/or data from a data file of data acquired during the operate through period.

At operation 318, the rebooted application is updated based on the saved configuration file. The application co-processor 110, having been rebooted and now executing an application previously shut down, is updated based on the last known good configuration data from before the application co-processor 110 was shut down and isolated for the radiation event. Additionally, or alternatively, the updating may include updating the application for any data acquired during the operate through period, which may be used to by the application co-processor 120 to account for changes that may have occurred during the radiation event.

In various embodiments, the radiation event may occur over a very short period of time, such as less than a second. However, the device may be traveling and small adjustments made by the device or to the device may cause the device to go off mission. Thus the loading of the application may need to account for and adjust for any conditions that arose that may have taken the device off mission or would impact the mission.

For example, a satellite in motion will continues to fly through space during a radiation event, and the satellite may experience a change in trajectory, or it may retain its trajectory but change positioning, which may be due to the radiation event. The application being executed on the application co-processor 120 will load the last known good configuration and then realign the satellite based on the data received on reboot and acquired while operating through the radiation event. This may include determining the current, new position relative to the position at the start of the radiation event shutdown, which may be a time zero point, and then integrate that with the last known configuration and realign from there.

Additionally, if a radiation event might cause damage or an error to occur with the operation of the management processor 110 or a management application executed by the management processor 110, the management processor 110 may be rebooted, and a management application may be loaded from memory, such as the first memory 130 that is not isolated during a radiation event.

In an exemplary embodiment, a satellite, prior to launch, may have applications and a boot loader stored to memory, such as memory 160. On mission start, the satellite may boot up, including booting the applications, which will be executed by the application co-processor 120 during normal operation. At regular intervals, the applications may save a known good configuration file to store a plurality of settings. The satellite may be traveling through space, and a solar flare may be detected by an infrared camera of a satellite or another peripheral. The solar flare may be detected at a distance away. The camera may generate a sensor signal to provide to the management processor 110 and/or the application co-processor 120 to provide information regarding what the camera has measured. The management processor 110 and/or the application co-processor 120 may receive the signal generated by the camera, and management processor 110 and/or the application co-processor 120 may make a determination based on the camera signal that a radiation event has occurred and that the satellite will be exposed to radiation at an upcoming time, which may be based on, among other things, the distance from the radiation event. Based on the distance, a first time until the radiation reaches the satellite may be determined. Just before the first time elapses, a configuration file with one or more settings of the application may be saved. The management processor 110 may utilize one or more bus switches to isolate the application co-processor 120 and associated memory at the time when the radiation from the radiation event reaches the satellite until the radiation has passed. Once the radiation is determined to have passed, which may be after a second period of time, the management processor 110 may cause the bus switches 210 to close and the application co-processor 120 to be rebooted, including the application(s) run thereon. The application may then be updated based on the saved configuration file.

In a similar example, a satellite may not detect a solar flare with a camera, but, instead, a radiation sensor may read a current radiation level. If the radiation level is above a radiation event threshold, then the management processor 110 may determine that a radiation event is occurring. This radiation event threshold may be associated with a radiation level associated with an event (e.g., a solar flare) or it may be associated with the lowest level of radiation one or more of the electrical components of the device may be rated for during normal operation. Based on the determination that a radiation event is occurring, the management processor 110 may utilize one or more bus switches to isolate the application co-processor 120 and associated memory the radiation event has passed. A determination that the radiation event has passed may be based on a subsequent radiation sensor reading, which may be after a period of time has passed. This determination that the radiation event has passed may be based on a current radiation level measurement falling below a threshold. This threshold associated with the passing of a radiation event may be the same threshold as used to determine the radiation event threshold or may be a different threshold, which may be lower or higher. Once the radiation event is determined to have passed, which may be after a period of time, the management processor 110 may cause the bus switches 210 to close and the application co-processor 120 to be rebooted, including the application(s) run thereon. The application may then be updated based on the saved configuration file.

FIG. 4 illustrates a flowchart according to an example method for saving configuration files in accordance with one or more embodiments of the present disclosure.

At operation 402, current application settings are extracted. In various embodiments, current application settings of an application running on the application co-processor 120 may be extracted from the application by the application co-processor 120.

At operation 404, a configuration file is generated. The application co-processor 120 may generate a configuration file containing the current application settings extracted at operation 402. The configuration file may include a time stamp to identify when the configuration file was generated. In various embodiments, the time stamps may be used during rebooting to identify the last known good configuration file.

At operation 406, the configuration file is saved to memory. The application co-processor 120 may save the configuration file generated at operation 404 to a memory associated with the application co-processor 120. In various embodiments, the configuration file may be saved to the fourth memory 160, which may be NOR flash.

In various embodiments, instead of generating and saving a newly generated configuration file, an existing configuration file may be updated with the extracted current application settings. The configuration file may also have a timestamp updated to a time associated with the update. Alternatively, there may be no timestamp and only the most recent current application settings may be stored in a configuration file.

At operation 408, a radiation event may be detected. In various embodiments, if a radiation event is detected, operation 402 may occur again to extract current application settings, generate a configuration file, and save the configuration file to memory associated with the application co-processor.

At operation 410, a first time period is waited. After the first time period has been waited, operation 402 occurs again to extract current applications file settings, which may be used to generate a configuration file, which may be saved. In this manner, a last known good configuration settings are available to the dual processor single board computer to use after reboot. In various embodiments the first time period may be based on the application being executed on the application co-processor as well as current operation of the system. For example, a satellite that is rapidly moving may have a first time period of one minute while, in contrast, a stationary satellite that is maintaining position and/or orbit may have a first time period of 5 minutes, 10 minutes, or longer.

In various embodiments, when the application co-processor 120 is shut down, the operations of FIG. 4 may not be able to occur until the application co-processor has been rebooted.

FIG. 5 illustrates a flowchart according to an example method for operating during a radiation event in accordance with one or more embodiments of the present disclosure. While some embodiments include only using a last known good configuration file, other embodiments of the present invention may continue to receive and store sensor data while operating through. As illustrated in FIG. 5, that data may be stored for use by the system or device once application(s) are rebooted.

At operation 502, sensor data may be received. In various embodiments, during a radiation event the management processor 110 may receive sensor data (or peripheral data or data from another computer), and the data received may associated with an application that will be rebooted. The application, however, is not being currently executed. The sensor data received may be stored such that when the application is rebooted the application may utilize the data to update the application.

At operation 504, a data file with sensor data may be updated. After receiving the sensor data at operation 502, the management processor 110 may determine the location of the data file and update the data file with the sensor data. The data file with sensor data may be located in a memory associated with the management processor, such as first memory 130, which may be operational during a radiation event.

At operation 506, it is determined if a radiation event has passed. If the radiation event has not passed, then then any additional sensor data received may be used to update the data file again. If the radiation event has passed, then operation 316 of rebooting the application may occur.

FIG. 6 illustrates a flowchart according to an example method for rebooting an example dual processor single board computer after a radiation event in accordance with one or more embodiments of the present disclosure.

At operation 602, the bus switches may be closed. Closing the bus switches may allow for power and ground connections to be made to the application co-processor and associated memories as well as the second memory 140 associated with the management processor 110.

At operation 604, a signal to reboot an application may be generated. The management processor 110 may generate a signal for the application co-processor to reboot.

At operation 606, the signal to reboot the application is transmitted to the application co-processor 120. The signal to reboot may be transmitted over a shared interface between the management processor 110 and the application co-processor 120. In various embodiments, such an interface may be over SpaceWire, Ethernet, or the like.

At operation 608, the application co-processor reboots the application. The application stored on a memory associated with the application co-processor, such as fourth memory 160, which may be NOR flash, may store the application and receiving the signal to reboot the application may cause the application co-processor 120 to reboot the application by loading the application.

At operation 610, that the application loaded correctly may be verified. In various embodiments, the radiation event may have exposed the application co-processor and associated memories (e.g., third memory 150 and fourth memory 160) to high doses of radiation. As part of the application being rebooted, the application co-processor 120 may perform one or more tests to determine and verify that the application loaded correctly and that associated data and/or files have not been corrupted through damage. Such a verification may be having the application perform one or more operations and/or executing for a period of time without generating an error.

In various embodiments, the management processor 110 may execute one or more applications, including applications managing other sensors, peripherals, or computers on the device. This may include instructing those sensors, peripherals, or computers to shut down, isolate, and reboot. Various sensors, peripherals, and/or computers may be brought down and/or rebooted in specific orders depending on the event. Additionally, or alternatively, the sensor, peripheral, and/or computer to be brought back up may depend on if the sensor, peripheral, and/or computer, or another sensor, peripheral, or computer, was damaged during the radiation event.

Operations and/or functions of the present invention have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

The invention claimed is:

1. A dual processor single board computer comprising:
   a management processor, wherein the management processor is radiation hardened;
   an application co-processor electrically connected to a first bus switch and a second bus switch, and wherein the application co-processor is configured to:
   run an application;
   save a first configuration file associated with the application;
   a first memory electrically connected to the application co-processor and electrically connected to the first bus switch and the second bus switch, wherein the first memory is configured to store the application;
   a power source connected to the first bus switch;
   a ground connected to the second bus switch;
   wherein the first bus switch is configured with at least an open position and a closed position, wherein in the closed position of the first bus switch the first bus switch is configured to electrically connect the application co-processor and the first memory to the power source, and wherein in the open position of the first bus switch the first bus switch is configured to isolate the application co-processor and the first memory from the power source;
   wherein the second bus switch is configured with at least an open position and a closed position, wherein in the closed position of the second bus switch the second bus switch is configured to electrically connect the application co-processor and the first memory to the ground, and wherein in the open position of the second bus switch the second bus switch is configured to isolate the application co-processor and the first memory from the ground;
   wherein the management processor is configured to:
   determine a detection of a radiation event;
   transmit, on determination of the radiation event, to the first bus switch and the second bus switch a first signal to cause the first bus switch and the second bus switch to open;
   determine that the radiation event has passed;
   transmit, upon the determination that the radiation event has passed, to the first bus switch and the second bus switch a second signal to cause the first bus switch and the second bus switch to close;
   transmit to the application co-processor a signal to cause the application co-processor to reboot the application; and
   wherein the application co-processor is further configured to update, after the application is rebooted, the application based on the first configuration file.

2. The dual processor single board computer of claim 1, wherein the dual processor single board computer further comprises at least one of a backplane and a front panel, and wherein the management processor is configured to receive a first sensor signal from a sensor via a backplane interface or a front panel interface.

3. The dual processor single board computer of claim 2, wherein the detection of a radiation event is based on the first sensor signal.

4. The dual processor single board computer of claim 3, wherein the management processor is further configured to receive a second sensor signal from the sensor, and wherein the determination that the radiation event has passed is based on the second sensor signal.

5. The dual processor single board computer of claim 4, wherein the second sensor signal is associated with a radiation level falling below a radiation event threshold.

6. The dual processor single board computer of claim 3, wherein the first sensor signal comprises a radiation level measurement, and wherein to determine a detection of a radiation event comprises comparing the radiation level measurement to a radiation event threshold.

7. The dual processor single board computer of claim 1, wherein the management processor is radiation hardened to at least 20,000 kilo-rads.

8. The dual processor single board computer of claim 1, wherein the application co-processor comprises an encrypted memory cache and wherein the management processor comprises an unencrypted memory cache.

9. The dual processor single board computer of claim 1, wherein the first memory is comprised of NOR flash memory.

10. The dual processor single board computer of claim 1, wherein the dual processor single board computer further comprises a printed circuit board with a front plane and a back plane, and wherein the management processor, the application co-processor, the first memory, the first bus switch, and the second bus switch are mounted on the printed circuit board.

11. A method comprising:
    providing a dual processor single board computer comprising:
    a management processor, wherein the management processor is radiation hardened;
    an application co-processor electrically connected to a first bus switch and a second bus switch;
    a first memory electrically connected to the application co-processor and electrically connected to the first bus switch and the second bus switch;
    wherein the first bus switch and the second bus switch are configured to operate to open and close;
    executing an application on the application co-processor;
    determining, by the management processor, a detection of a radiation event;
    generating, by the management processor, a control signal to operate the first bus switch and the second bus switch to open;
    opening, in response to the radiation event, the first bus switch and the second bus switch based on the control signal generated by the management processor, wherein opening the first bus switch isolates the application co-processor and the first memory from a power source and opening the second bus switch isolates the application co-processor and the first memory from a ground;
    determining that the radiation event has passed;
    closing, on a determination that the radiation event has passed, the first bus switch and the second bus switch, wherein closing the first bus switch electrically connects the application co-processor and the first memory to the power source and closing the second bus switch electrically connects the application co-processor and the first memory to the ground; and
    rebooting the application on the application co-processor.

12. The method of claim 11, wherein the dual processor single board computer further comprises a backplane and a front panel; and wherein the method further comprises receiving, prior to determining an occurrence of a radiation event, a first sensor signal at the management processor from a sensor via a backplane interface or a front panel interface.

13. The method of claim 12, wherein the determining of an occurrence of a radiation event is based on the first sensor signal.

14. The method of claim 13 further comprising:
receiving at the management processor a second sensor signal from the sensor; and
determining, based on the second sensor signal, that an occurrence of the radiation event has passed.

15. The method of claim 14, wherein the second sensor signal is associated with a radiation level falling below a radiation event threshold.

16. The method of claim 13, wherein the first sensor signal comprises a radiation level measurement, and wherein determining of a radiation event is based on the first sensor signal comprises comparing the radiation level measurement to a radiation event threshold.

17. The method of claim 11 further comprising:
verifying, after rebooting the application, the application rebooted correctly.

18. The method of claim 11 further comprising:
saving, by the application co-processor and before determining the detection of a radiation event, a configuration file associated with the application executed on the application co-processor; and
updating, after the application is rebooted, the application based on the configuration file.

19. The method of claim 18, further comprising:
saving, after saving the configuration file, one or more additional configuration files associated with the application executed on the application co-processor, wherein each of the configuration file and the one or more additional configuration files is saved with a timestamp; and
wherein updating the application is based on the configuration file or the one or more additional configuration files with a most recent timestamp.

20. The method of claim 18 further comprising:
iteratively updating, after saving the configuration file but before determining the detection of the radiation event, the save of the configuration file.

* * * * *